US008880243B1

(12) United States Patent
Duvall et al.

(10) Patent No.: US 8,880,243 B1
(45) Date of Patent: Nov. 4, 2014

(54) SYSTEM, DEVICE, AND METHOD FOR PRESENTING FLIGHT INFORMATION OF ONE OR MORE AIRCRAFT ON A DISPLAY UNIT

(75) Inventors: Roger M. Duvall, Garden Grove, CA (US); Ngoc-Nga Do, Orange, CA (US); Ara J. Derderian, Trabuco Canyon, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 84 days.

(21) Appl. No.: 13/460,531

(22) Filed: Apr. 30, 2012

(51) Int. Cl.
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G08G 5/00* | (2006.01) |

(52) U.S. Cl.
CPC .............. *G01C 23/00* (2013.01); *G01C 23/005* (2013.01); *G08G 5/0021* (2013.01)
USPC .................. 701/3; 701/14; 701/528; 701/120

(58) Field of Classification Search
CPC ... G08G 5/025; G08G 5/0052; G08G 5/0021; G08G 5/0043; G01C 21/00; G01C 23/00; G01C 21/26; G01C 21/36; B64D 9/00; B64D 11/00; B64D 11/06; B64D 45/00
USPC ............ 340/961, 945, 973, 972, 979; 342/29, 342/176; 701/3, 16, 23, 208, 14, 120, 528; 345/641; 704/275
See application file for complete search history.

(56) References Cited

U.S. PATENT DOCUMENTS

| 6,885,313 | B2 * | 4/2005 | Selk et al. ..................... 340/945 |
| 7,030,780 | B2 * | 4/2006 | Shiomi et al. ................. 340/961 |
| 7,605,719 | B1 * | 10/2009 | Wenger et al. ................ 340/974 |
| 7,609,200 | B1 * | 10/2009 | Woodell et al. ............... 342/176 |
| 7,747,360 | B2 * | 6/2010 | Canu-Chiesa et al. ............ 701/3 |
| 7,864,096 | B2 * | 1/2011 | Stayton et al. .................. 342/29 |
| 7,924,172 | B1 * | 4/2011 | Swearingen et al. ......... 340/972 |
| 7,961,115 | B2 * | 6/2011 | Raje .............................. 340/979 |
| 7,970,506 | B2 * | 6/2011 | DeMarco et al. ............... 701/23 |

(Continued)

FOREIGN PATENT DOCUMENTS

WO WO 2008060260 A2 * 5/2008 ............. G01C 23/00

*Primary Examiner* — Calvin Cheung
*Assistant Examiner* — Luis A Martinez Borrero
(74) *Attorney, Agent, or Firm* — Donna P. Suchy; Daniel M. Barbieri

(57) ABSTRACT

A present novel and non-trivial system, device, and method for presenting flight information of a plurality of aircraft on a display unit. An image generator ("IG") is programmed to receive a first request for flight information for one of a plurality of aircraft; receive first flight information of a viewer aircraft when included in the request; send a second request for second flight information of a target aircraft for each target aircraft included in the request; receive the second flight information; retrieve terrain data corresponding the flight information of a focal aircraft; generate an image data set representative of a three-dimensional scene of a selectable view comprised of the sky, the spherical surface of the Earth, a first aircraft symbol corresponding to the received flight information, and a first curved flight path; and provide the image data set to a display unit.

21 Claims, 6 Drawing Sheets

(56) References Cited

U.S. PATENT DOCUMENTS

| | | | |
|---|---|---|---|
| 8,160,755 B2* | 4/2012 | Nichols et al. | 701/3 |
| 8,280,741 B2* | 10/2012 | Colin et al. | 704/275 |
| 2001/0013836 A1* | 8/2001 | Cowie | 340/961 |
| 2003/0034901 A1* | 2/2003 | Griffin, III | 340/945 |
| 2007/0005199 A1* | 1/2007 | He | 701/16 |
| 2009/0207048 A1* | 8/2009 | He et al. | 340/973 |
| 2010/0082184 A1* | 4/2010 | Nichols et al. | 701/3 |
| 2011/0095913 A1* | 4/2011 | Painter et al. | 340/972 |
| 2011/0313658 A1* | 12/2011 | He | 701/208 |
| 2012/0194556 A1* | 8/2012 | Schmitt et al. | 345/641 |

* cited by examiner

SYSTEM, DEVICE, AND METHOD FOR PRESENTING FLIGHT INFORMATION OF ONE OR MORE AIRCRAFT ON A DISPLAY UNIT

BACKGROUND OF THE INVENTION

1. Field of the Invention

This invention pertains generally to the field of aircraft display units that present information of aircraft position and flight plan information to a viewer.

2. Description of the Related Art

Visual displays units are employed in passenger cabins of an aircraft to provide passengers with flight information about the current flight. While in flight, the passenger may look at the screen of the display unit to determine the progress of the flight and the current position of the aircraft in relation to, for example, geographic boundaries, the departure airport, and the destination airport. Depending on the presentation, the passenger may observe the initial flight plan, the actual ground track of the aircraft, and the position of the aircraft along the flight plan. Cabin display units provide for a convenient way in which passengers are presented with flight information instead of having to ask others.

For the owners or operators of a fleet of aircraft, knowledge about the location of one or more aircraft in the fleet may be considered essential knowledge when, for example, planning for the future utilization of the fleet aircraft. Moreover, if he or she is on board the aircraft or spends any considerable time flying in aircraft, information about the location(s) of the fleet may be limited to the flight information of the current flight of the aircraft he or she is on.

BRIEF SUMMARY OF THE INVENTION

The embodiments disclosed herein present at least one novel and non-trivial system, device, and method for presenting flight information of a plurality of aircraft on a display unit, either in the air or on the ground. With the embodiments disclosed herein, a user may select any aircraft in a fleet of aircraft and observe its position and active flight plan in a three-dimensional scene which includes the curvature and a spherical surface of the Earth.

In one embodiment, a system is disclosed for presenting flight information of a plurality of aircraft on a display unit. The system may be comprised of a display unit, a manual input device, a source of terrain data, a plurality of flight information data sources, and an image generator ("IG"). The plurality of flight information data sources could include a network database.

In another embodiment, a device is disclosed for presenting flight information of a plurality of aircraft on a display unit. This device may be configured to generate an image data set as a function of terrain data, flight information data of a viewer aircraft and/or each target aircraft. The image data set could be representative of a three-dimension scene of a user-selectable view comprised of the sky and a spherical surface of the Earth used as a background, and a first curved flight path and a first aircraft symbol employed as overlays.

In another embodiment, a method is disclosed for presenting flight information of a plurality of aircraft on a display unit, where the method could be performed by the IG. When properly configured, the IG may receive first request data, receive first flight information data when first request data includes a viewer aircraft, send a second request for second flight information data for each aircraft in the first request, receive second flight information data in response to the second request, retrieve terrain data corresponding to either the flight information data of a focal aircraft, generate the image data, and provide the image data set to the display unit.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
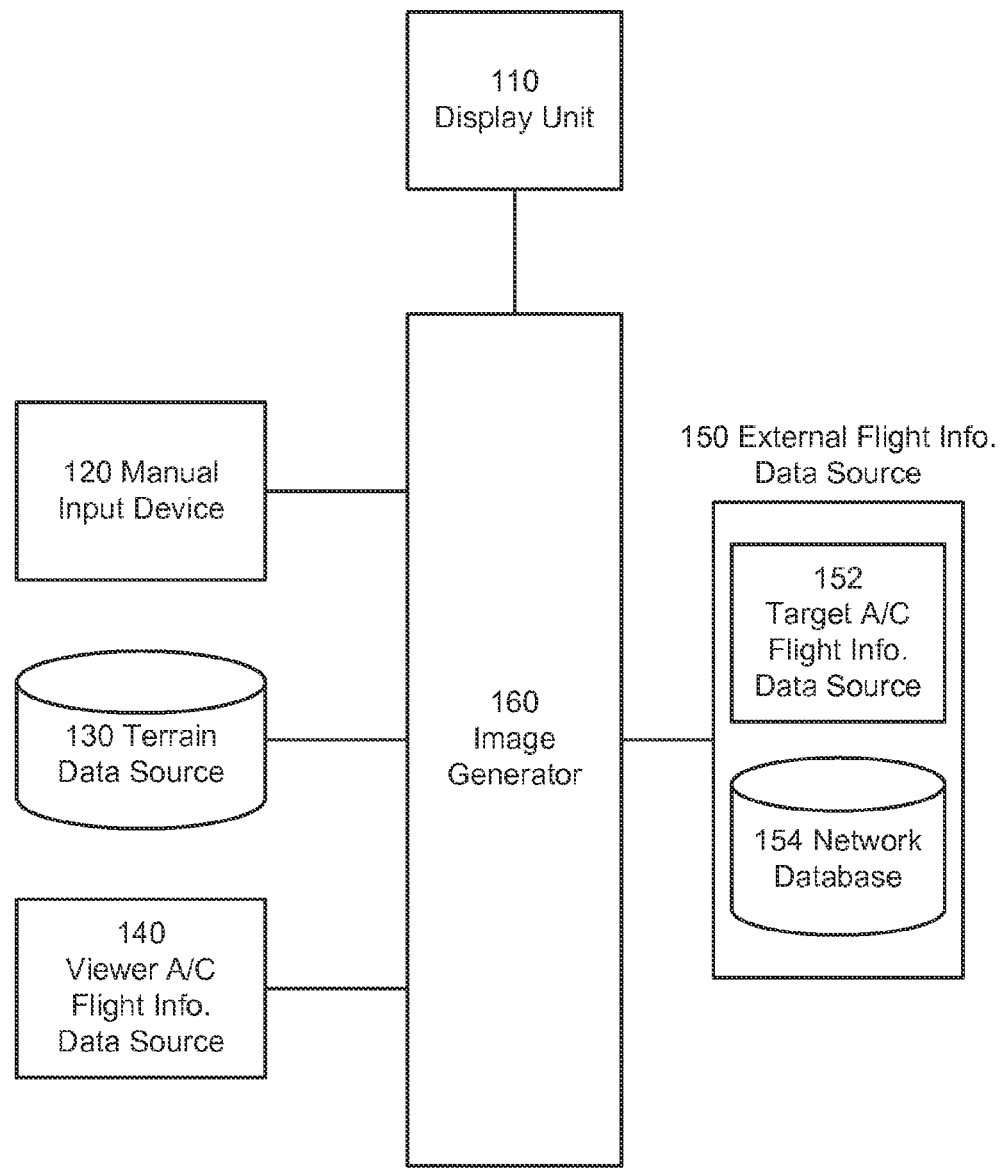
FIG. 1 depicts a block diagram of a flight information presentation system.

FIG. 1 depicts a block diagram of a flight information presentation system (collectively, "presentation system") 100 suitable for implementation of the techniques described herein. The presentation system 100 of an embodiment of FIG. 1 includes a display unit 110, a manual input device 120, a terrain data source 130, a viewer aircraft flight information data source ("VAFIDS") 140 an external flight information data source 150, and an image generator ("IG") 160.

In an embodiment of FIG. 1, the display unit 110 could be comprised of any unit on which the viewer may view flight information and/or position information of one or more aircraft of a network, where such network could be comprised of, but not limited to, all of the aircraft owned and/or operated by a common enterprise; as embodied herein, the aircraft network may be comprised of a viewer aircraft and one or more target aircraft. The display unit 110 could be comprised of a unit on which passengers in the cabin may view and/or track their flight's progress such as, but not limited to, seat-back display units, display units stowed in the armrests of passenger seats, and/or display units attached to a cabin wall and/or ceiling and viewable to multiple passengers.

In addition to the display units found installed in an aircraft, the disclosures herein may apply to both portable or non-portable devices such as, but not limited to, tablet devices (e.g., an iPad developed by Apple, Inc., devices in which an Android operating system developed by Google Inc. is installed, etc. . . . ), electronic flight bags, smartphones, laptop computers, and/or desktop computers irrespective of location (i.e., internal or external to the aircraft) with which the IG 160 is in communication. As embodied herein, the display unit 110 may receive an image data set generated by the IG 160 using the methods disclosed herein; moreover, as discussed in the following paragraph, the display unit 110 may provide input to the IG 160 if it is integrated with the manual input device 120.

In an embodiment of FIG. 1, the manual input device 120 could comprise any source for facilitating a viewer's interaction with graphical user interfaces (singularly, "GUI") referred to as interactive widgets that are displayed on the surface of the display unit 110; as embodied herein, the terms "user" and "viewer" are synonymous. The manual input device 120 may include any device that allows for the manual selection of widgets and/or entry of data. Such devices could include, but are not limited to, a tactile device (e.g., keyboard, cursor control device, etc. . . . ) and/or speech recognition systems. Also, the manual input device 120 could be integrated with the display unit 110 if it is, for example, configured to receive pilot input (e.g., touch screen display); tablet devices and smartphones integrate the manual input device 120 with the display unit 110. As embodied herein, the manual input device 120 may provide input representative of a viewer's selection to the IG 160.

In an embodiment of FIG. 1, the terrain data source 130 could comprise any source of terrain data, obstacle data, or both. As embodied herein, a terrain data source 130 may include, but is not limited to, a terrain database configured to store terrain data contained in digital elevation models ("DEM"). Generally, the terrain data of a DEM is stored as grids, and each grid represents an area of terrain and is commonly referred to as a terrain cell. The terrain data source 130 is a data source known to those skilled in the art. As embodied herein, the IG 160 may retrieve terrain data representative of a spherical surface of the Earth from the terrain data source 130.

In an embodiment of FIG. 1, the VAFIDS 140 could be any source(s) from which flight information such as, but not limited to, flight plan and/or aircraft position information of a viewer aircraft may be stored and provided to or retrieved by the IG 160. One VAFIDS 140 is commonly known as a flight management system ("FMS"). The FMS may perform a variety of functions performed to help the crew in the management of the flight, and such functions are known to those skilled in the art. In the performance of its many functions, the FMS may receive navigation data from one or more navigation systems containing information regarding the current state of the aircraft. The navigation system could be comprised of, but is not limited to, an air/data system, an attitude heading reference system, an inertial guidance system (or inertial reference system), a global navigation satellite system ("GNSS") (or satellite navigation system such as the global positioning system ("GPS")), and a radio altimeter system, all of which are known to those skilled in the art. As embodied herein, the navigation system could provide navigation information including, but not limited to, geographic position, altitude, attitude, speed, vertical speed, and heading. As embodied herein, aircraft position could be comprised of geographic position (e.g., latitude and longitude coordinates) and altitude, and direction may be derived from either geographic position, aircraft position, or both.

It should be noted that, as embodied herein for any unit, device, source, or system in an aircraft including the FMS and/or navigation system, data could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

In an embodiment of FIG. 1, the external flight information data source 150 could be any source that provides flight plan and/or aircraft position of target aircraft of the aircraft network that is sent to the IG 160 via a communications interface such as, but not limited to, a datalink. The external flight information data source 150 could be comprised of a target aircraft flight information data source ("TAFIDS") 152 and/or a network database 154. The TAFIDS 152 could be comprised of a flight information data source such as an FMS that is installed in a target aircraft; the TAFIDS 152 could transmit flight information to the viewer aircraft and/or network database 154 via a datalink of the target aircraft. The network database 154 could be any database configured to receive and/or store flight information received real-time from one or more aircraft of the network. When requested by the viewer aircraft, the network database 154 may provide flight information of one or more aircraft in the network.

In an embodiment of FIG. 1, the IG 160 may be any electronic data processing unit which executes software or source code stored, permanently or temporarily, in a digital memory storage device as discussed above. The IG 160 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also consist of more than one electronic data processing units. As embodied herein, the IG 160 could be a processor(s) used by or in conjunction with any other system of the aircraft.

The IG 160 may be programmed or configured to receive as input data representative of information obtained from the display unit 110 (if integrated with an input device), the manual input device 120, the terrain data source 130, the VAFIDS 140, and through a datalink. A datalink could be comprised of those interface system(s) configured to receive and provide data and/or signals from source(s) external to the aircraft including, but not limited to, ground stations and satellites.

As embodied herein, the terms "programmed" and "configured" are synonymous with respect to the execution of software or source code developed for the specific functions and methods embodied herein. The IG 160 may be electronically coupled to systems and/or sources to facilitate the receipt of input data; as embodied herein, operatively coupled may be considered as interchangeable with electronically coupled. The IG 160 may be programmed to execute the methods embodied herein and discussed in detail below. The IG 160 may be programmed to provide output data and/or signal data to the display unit 110 and/or the VAFIDS 140. The IG 160 may be electronically coupled to systems and/or units to facilitate the providing of output data representative of a procedure. It is not necessary that a direct connection be made; instead, such receipt of input data and the providing of output data could be provided through a data bus or through a wireless network.

The advantages and benefits of the embodiments discussed herein may be illustrated by showing examples in FIGS. 2A through 2F of how flight information about network aircraft may be acquired and presented to the viewer of the display unit 110. In the following examples, it will be assumed that the viewer is onboard the viewer aircraft taking off from Los Angeles International Airport ("LAX") in Los Angeles, Calif., United States and landing in Denver International Airport ("DEN") located in Denver, Colo., United States. Also, it will be assumed that the viewer has access to a display unit integrated with a manual device located in the seatback of the seat in front of the viewer. Although the following examples will be drawn to an LAX-DEN flight, these examples are provided for the sole purpose of illustration and not limitation.

Figure 2A:
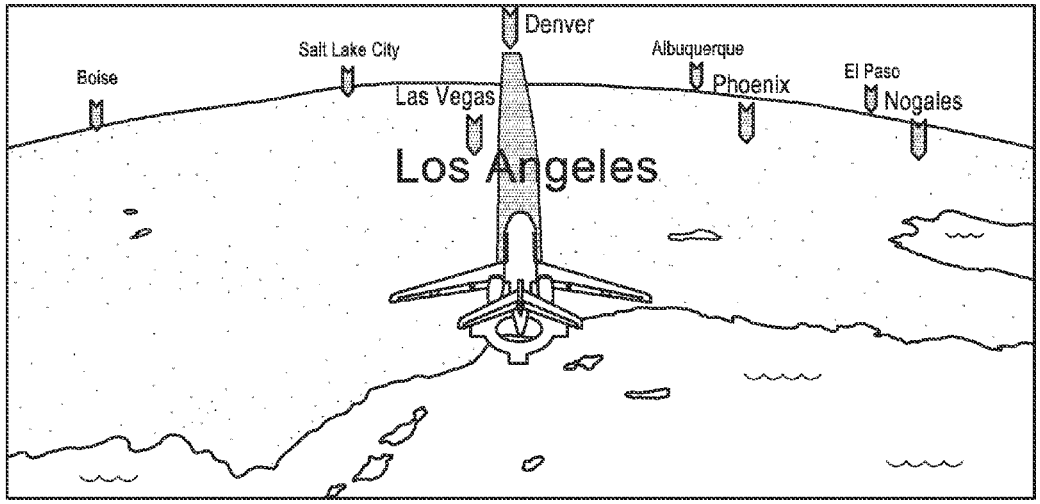
FIG. 2A illustrates a first image of flight information of the focal aircraft.

Referring to FIG. 2A, flight information is presented as an image displayed on the display unit 110. As illustrated, the image is comprised of the sky, a spherical surface of Earth, a curved flight path, and a symbol of an aircraft. The sky and spherical surface form a background that is overlaid by the curved flight path and aircraft symbol. The view, selectable by a pilot using a user-interactive menu via the manual input device 120, is forward-facing (i.e., looking towards the front of the aircraft) and pointed in the direction of the aircraft's heading; the view looking in the direction of the aircraft's heading will be considered herein as the default view.

In the example of FIG. 2A, assume that the viewer aircraft is located above Los Angeles (i.e., the aircraft has just departed LAX), and that the flight plan initially approved by air traffic control is still the active flight plan. As embodied herein, the IG 160 may receive data from the VAFIDS 140 representative of flight information comprised of the active flight plan and aircraft position. Based upon the data and the direction of the view, the IG 160 may retrieve the terrain data corresponding to the flight information, generate an image data set representative of the image shown in FIG. 2A, and provide it to the display unit 110; here, the curved flight path may be representative of and coincide with the active flight plan, and the aircraft symbol may be representative of and coincide with the aircraft position.

Figure 2B:
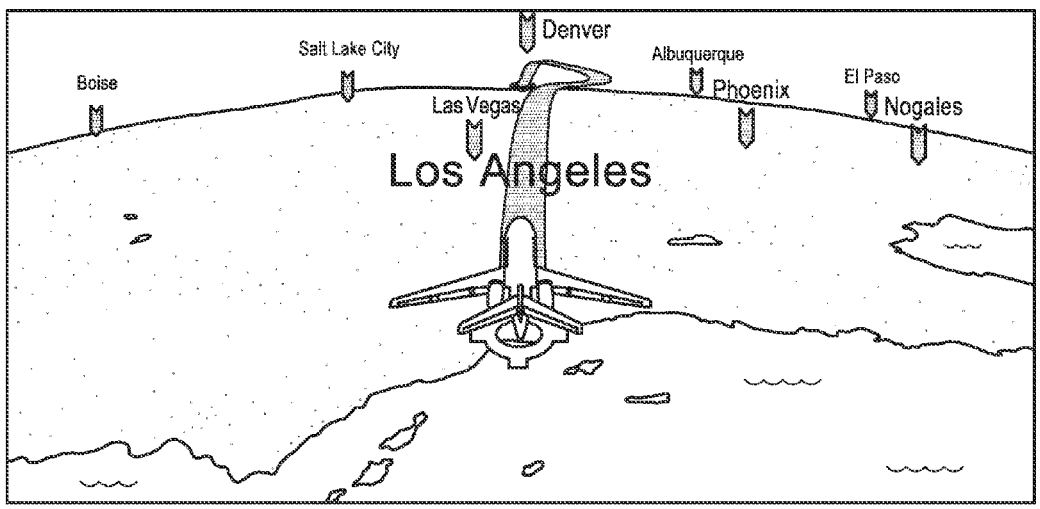
FIG. 2B illustrates a second image of flight information of the focal aircraft.

In the example of FIG. 2B, assume that there has been a change in the active flight plan of the viewer aircraft due to inclement weather ahead; that is, the viewer flight plan is no longer the active flight plan. Because the VAFIDS 140 may be configured to provide flight information data representative of the active flight plan to the IG 160, a change in the active flight plan with cause a change in the appearance of the curved flight path. A comparison of FIGS. 2A and 2B indicates the change in the appearance of the curved flight path.

Figure 2C:
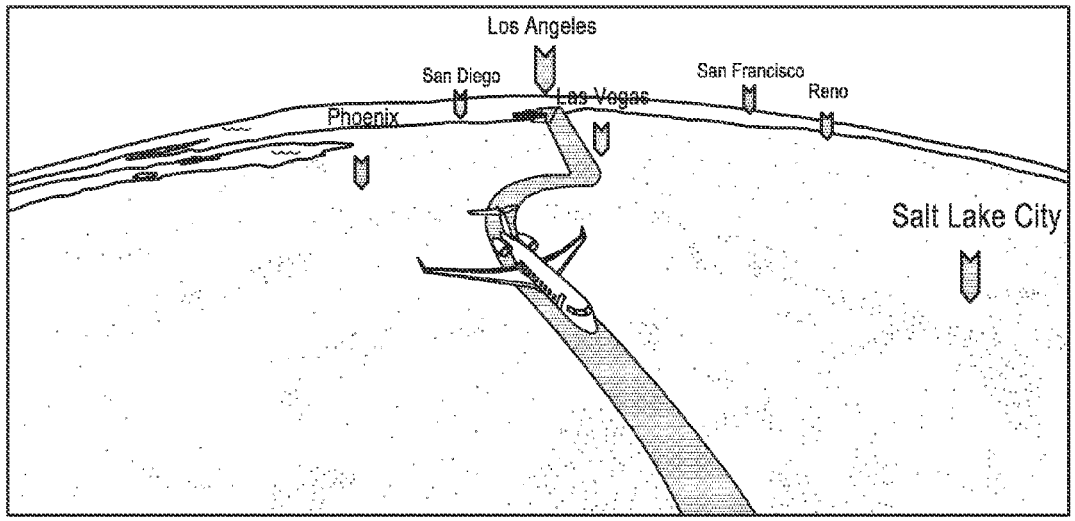
FIG. 2C illustrates a third image of flight information of the focal aircraft.

In the example of FIG. 2C, assume that the viewer aircraft has flown to a location somewhere in between LAX and DEN, and that there has been no change in the active flight plan; however, the viewer has selected a rearward-facing view in an approximately opposite direction of the aircraft's heading through the use of the manual input device 120. Because the position of the aircraft has changed from FIG. 2B and because the view had changed, the three-dimensional scene has changed. A comparison of FIGS. 2B and 2C indicates the change in the aircraft position and the change in the three-dimensional scene.

Figure 2D:
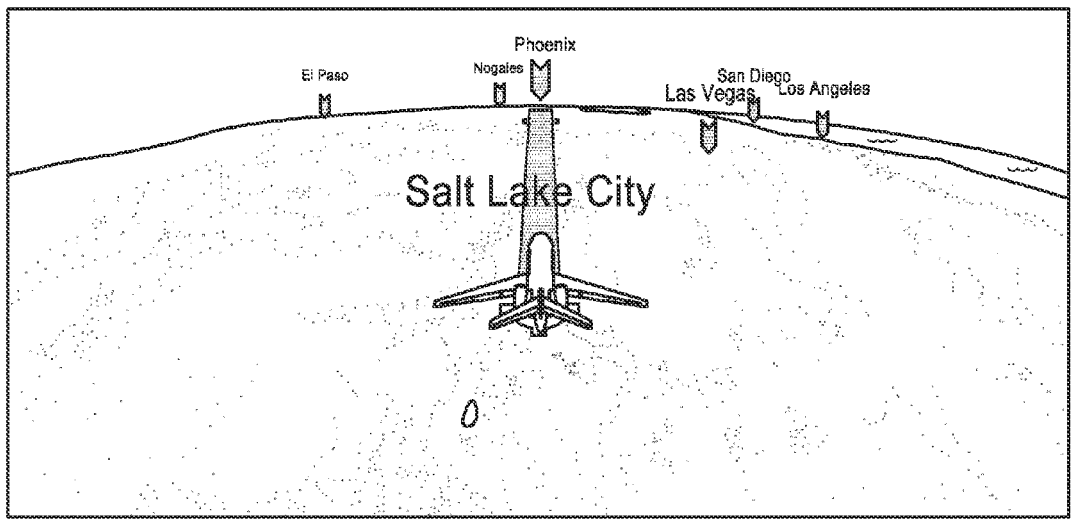
FIG. 2D illustrates a fourth image of flight information of the focal aircraft.

For the example of FIG. 2D, assume that the viewer wants to view flight information of a target aircraft of the network aircraft. Here, through the use of a user-interactive menu, he or she may request a target aircraft by selecting an aircraft-specific identifier through the use of the manual input device 120. In this example, it will be assumed that the target aircraft is taking off from Salt Lake City International Airport ("SLC") in Salt Lake City, Utah, United States and landing in Phoenix Sky Harbor International Airport ("PHX") located in Phoenix, Ariz., United States.

In the example of FIG. 2D, assume that the target aircraft is located above Salt Lake City (i.e., the aircraft has just departed SLC), and that the flight plan initially approved by air traffic control is still the active flight plan. As embodied herein, the IG 160 of the viewer aircraft may receive via its datalink flight information data from the external flight information data source 150, where such data could be representative of flight information comprised of the active flight plan and aircraft position of the target aircraft. After receiving this data and the direction of the view, the IG 160 may retrieve the terrain data corresponding to the target aircraft flight information, generate an image data set representative of the image shown in FIG. 2D, and provide it to the display unit 110; here, the curved flight path may be representative of and coincide with the active flight plan of the target aircraft, and the aircraft symbol may be representative of and coincide with the aircraft position of the target aircraft.

Figure 2E:
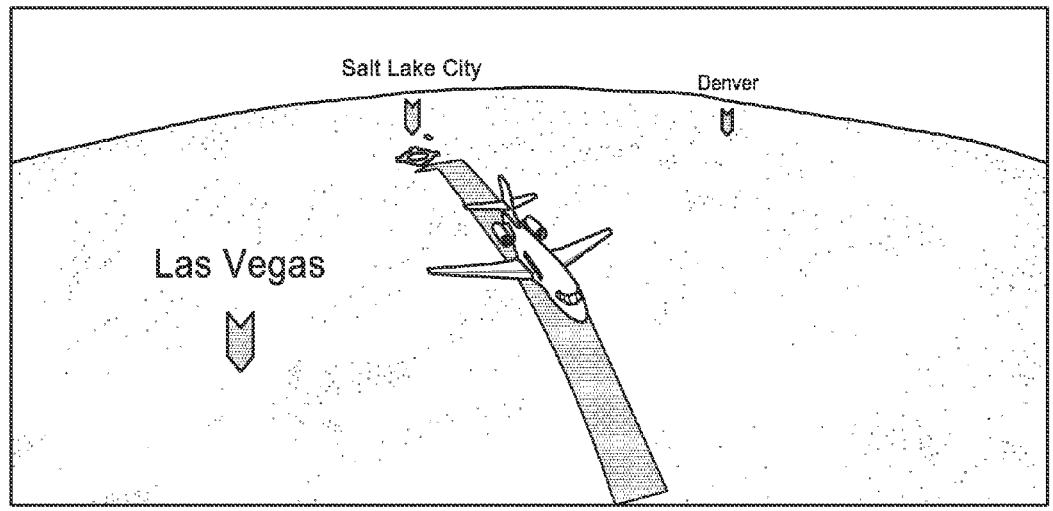
FIG. 2E illustrates a fifth image of flight information of the focal aircraft.

In the example of FIG. 2E, assume that the target aircraft has flown to a location somewhere in between SLC and PHX, and that there has been no change in the active flight plan; however, the viewer has selected a rearward-facing view. Because the position of the aircraft has changed from FIG. 2D and because the view had changed, the three-dimensional scene has changed. A comparison of FIGS. 2D and 2E indicates the change in the aircraft position and the change in the three-dimensional scene.

Figure 2F:
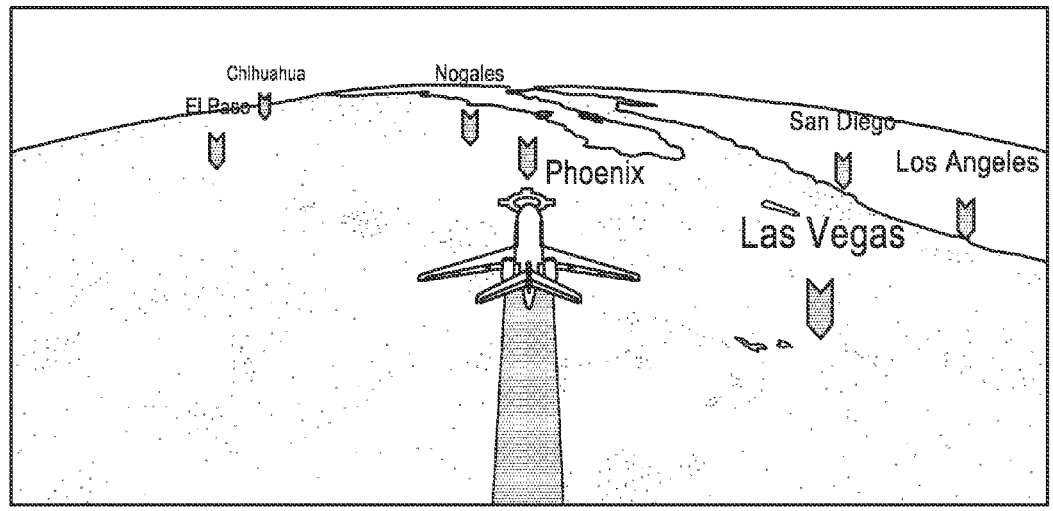
FIG. 2F illustrates a sixth image of flight information of the focal aircraft.

In the example of FIG. 2F, assume that the target aircraft is approaching PHX, and that there has been no change in the active flight plan; however, the viewer has selected a forward-facing view (or a default view). Because the position of the aircraft has changed from FIG. 2E and because the view had changed, the three-dimensional scene has changed. A comparison of FIGS. 2E and 2F indicates the change in the aircraft position and the change in the three-dimensional scene.

In the preceding examples of FIGS. 2A through 2F, flight information of only one aircraft was provided. As embodied herein, flight information of a second or more aircraft of the network may be provided for each aircraft appearing in the selectable view.

Figure 3A:
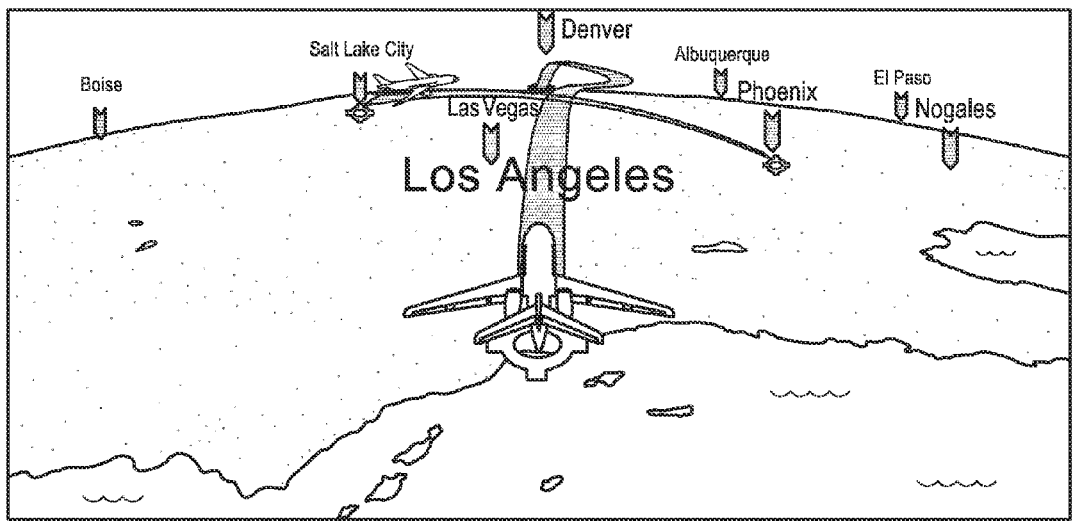
FIG. 3A illustrates a first image of flight information of a plurality of aircraft.

Referring to FIG. 3A (FIG. 2B with the SLC-PHX flight path and aircraft symbol in the background), assume that the scenario provided in FIG. 2B applies in which the selectable view is pointed in the direction of the aircraft's heading. In addition, the viewer has selected to view the target aircraft determined to be within the selectable view. Assume that only the target aircraft that will be determined to be within the selectable view is the target aircraft of FIGS. 2D through 2F flying the SLC-PHX leg. As embodied herein, the IG 160 may receive data from both the VAFIDS 140 representative of flight information comprised of the active flight plan and aircraft position of the viewer aircraft and the external flight information data source 150, where such data could be representative of flight information comprised of the active flight plan and aircraft position of each target aircraft. Because the viewer is interested in more than one aircraft in the fleet, a focal aircraft may be selected.

In the example of FIG. 3A, the viewer has selected the viewer aircraft to be the focal aircraft as shown by its predominance in the scene. Based upon the data and the direction of the view, the IG 160 may retrieve the terrain data corresponding to the flight information of the focal aircraft (here, the viewer aircraft flying the LAX-DEN leg), determine that the non-focal aircraft appears within the selectable view, generate an image data set representative of the image shown in FIG. 3A, and provide it to the display unit 110; here, the curved flight paths may be representative of and coincide with the active flight plans of both the focal aircraft and each non-focal aircraft determined to be within the selectable view, and the aircraft symbol may be representative of and coincide with the aircraft positions of the focal and non-focal aircraft.

Figure 3B:
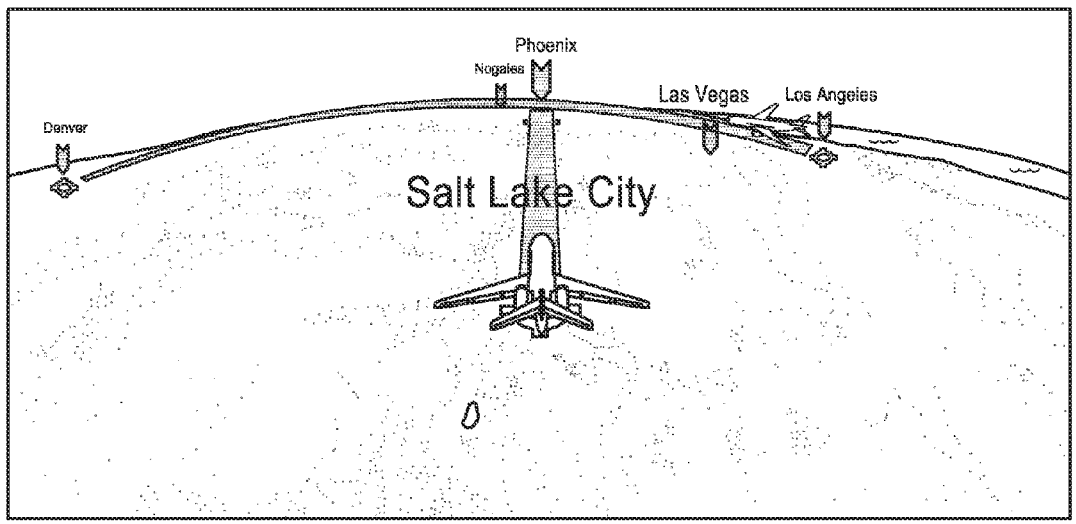
FIG. 3B illustrates a second image of flight information of a plurality of aircraft.

Referring to FIG. 3B, (FIG. 2D with the LAX-DEN and aircraft symbol in the background) assume that the scenario provided in FIG. 2D applies; that is, assume that the viewer selects that focal aircraft to be the target aircraft of the network which happens to be the aircraft flying the SLC-PHX leg of FIGS. 2D through 2F. Also, assume that the viewer wants to view the viewer aircraft flying the LAX-DEN leg from the perspective of the focal aircraft if it appears in the view selectable by the viewer. As embodied herein, the IG 160 may receive data from both the VAFIDS 140 representative of flight information comprised of the active flight plan and aircraft position of the viewer aircraft and the external flight information data source 150, where such data could be representative of flight information comprised of the active flight plan and aircraft position of the target aircraft.

In this example, the viewer has selected the target aircraft to be the focal aircraft as shown by its predominance in the scene. Based upon the data and the direction of the view, the IG 160 may retrieve the terrain data corresponding to the flight information of the focal aircraft (here, the target aircraft flying the SLC-PHX leg), determine that the non-focal aircraft appears within the selectable view, generate an image data set representative of the image shown in FIG. 3B, and provide it to the display unit 110; here, the curved flight paths may be representative of and coincide with the active flight plans of both the focal aircraft and each non-focal aircraft determined to be within the selectable view, and the aircraft symbol may be representative of and coincide with the aircraft positions of the focal and each non-focal aircraft.

Figure 4:
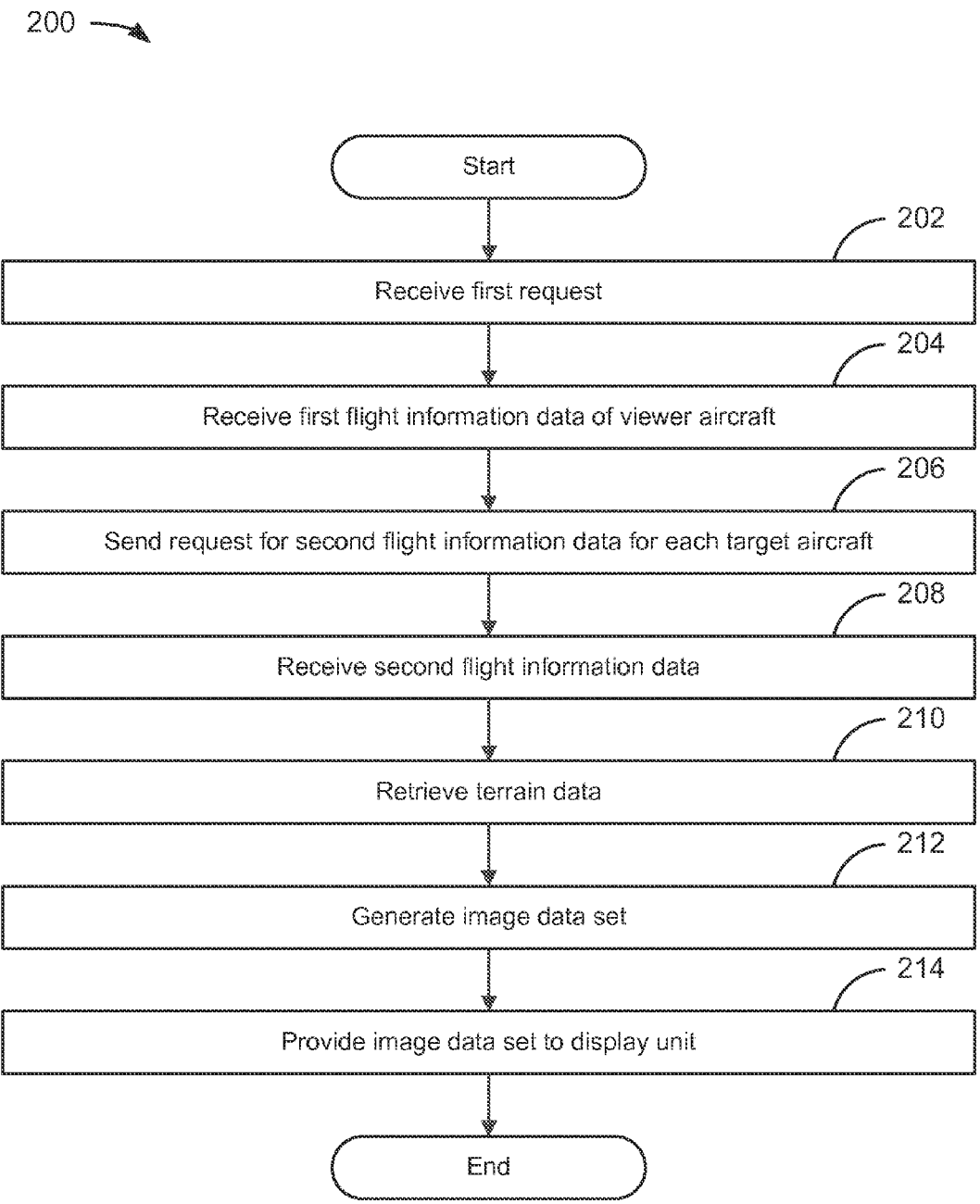
FIG. 4 depicts a flowchart for presenting flight information of a plurality of aircraft on a display unit.

The drawings of FIG. 4 depict flowchart 200 disclosing an example of a method for presenting flight information of a plurality of aircraft, where the IG 160 may be programmed or configured with instructions corresponding to the following modules embodied in the flowchart. Also, the IG 160 may be a processor of a module such as, but not limited to, a printed circuit board having one or more input interfaces to facilitate the two-way data communications of the IG 160, i.e., to facilitate the receiving and providing of data. As necessary for the accomplishment of the following modules embodied in the flowchart, the receiving of data is synonymous and/or interchangeable with the retrieving of data, and the providing of data is synonymous and/or interchangeable with the making available or supplying of data.

Flowchart 200 begins in FIG. 4 with module 202 with the receiving of request data corresponding to a selection, where the selection may be made from a user-interactive menu via the manual input device 120. As embodied herein, the manual input device 120 could be the display unit with an integrated manual input device. The request could include a request for flight information of the viewer aircraft, flight information of one or more target aircraft, or both. If the user wishes to see flight information of one or more target aircraft, an aircraft-specific identifier of the each target aircraft could be included in the request. This first request could also include information corresponding to a view that the viewer has selected; if no view has been selected, the viewer could be making an implied selection of a view corresponding to a default view.

In addition, the first request could also include information corresponding to a focal aircraft which may be the main aircraft in the view appearing approximately front and center in the three-dimensional scene of the image; if no focal aircraft has been selected, the viewer could be making an implied selection that the focal aircraft corresponds to the viewer aircraft.

The flowchart continues with module 204 with the receiving of flight information data of the viewer aircraft from the VAFIDS 140 when the first request includes the viewer aircraft. In another embodiment, a request including the viewer aircraft could be made by a viewer not located on the viewer aircraft and/or through the manual input device 120 that is a portable device (e.g., iPad). If so, in order for the IG 160 to receive flight information data from the VAFIDS 140, the IG 160 could be programmed to send a request to the VAFIDS 140 of the viewer aircraft, where a signal representative of this request is then transmitted the VAFIDS 140 via at least one datalink or communications interface of the viewer aircraft. In response to this request, the IG 160 could then receive the flight information data from the VAFIDS 140.

Alternatively, the IG 160 could be programmed to send a request to the network database 154, where a signal representative of this request is then transmitted to the network database 154. In response to this request, the IG 160 could then receive the flight information data of the viewer aircraft from the network database 154.

The flowchart continues with module 206 with the sending of request for flight information data of each target aircraft included in the first request. As embodied herein, a signal representative of this request could be transmitted via a datalink(s) to one or more external flight information data sources 150 comprised of at least one TAFIDS 152 and/or the network database 154 configured to receive and store real-time flight information from one or more aircraft of the network.

The flowchart continues with module 208 with the receiving of the second flight information data of each target aircraft in the request in response to the request sent in module 206. As embodied herein, the IG 160 could receive via a datalink(s) the flight information data of each target from one or more external flight information data sources 150.

The flowchart continues with module 210 with the retrieving of terrain data representative of a spherical surface of the Earth. The retrieval of terrain data could correspond to both the selectable view and the active flight plan of the focal aircraft.

The flowchart continues with module 212 with the generating of an image data set as a function of the terrain data, the flight information of the viewer aircraft if included in the first request, and the flight information of the target aircraft for each target aircraft included in the request. As embodied herein, the viewer aircraft or one target aircraft could be requested. Here, the image data set may be representative of a three-dimensional scene of the selectable view comprised of the sky, the spherical surface of the Earth, a first aircraft symbol, and a first curved flight path. The background of the scene may be comprised of the sky and the spherical surface of the Earth. The first curved flight path could overlay the background of the three-dimensional scene, where the path could be three-dimensional and representative of and coinciding with the active flight plan of the focal aircraft; similarly, the first aircraft symbol could overlay the background of the three-dimensional scene, where the symbol could be three-dimensional and representative of and coincide with the position of the focal aircraft.

In an additional embodiment, the image data set could be further representative of at least one second curved flight path of each non-focal aircraft determined by the IG 160 to be within the selectable view. Each second curved flight path could overlay the background of the three-dimensional scene, where each such path could be three-dimensional and representative of and coincide with active flight plan of its corresponding non-focal aircraft; similarly, each such second aircraft symbol could overlay the background of the three-dimensional scene, where each such symbol could be three-dimensional and representative of and coincide with the position of its corresponding non-focal aircraft.

The flowchart continues with module 214 with the providing of the image data set to the display unit, whereby the view of the three-dimensional scene represented in the image data set is presented on the screen of the display unit. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating flight information of a plurality of aircraft that is presentable on a display unit, such system comprising:
   a display unit configured to present a user-interactive menu;
   a manual input device;
   a source of terrain data;
   a first data source, where
      the first data source is comprised of first flight information data of a viewer aircraft;
   at least one second data source, where
      each second data source is comprised of second flight information data of at least one target aircraft; and
   an image generator configured to
      receive data representative of a first request in response to a selection made from the user-interactive menu via the manual input device, where
      the first request
         corresponds to a selectable view and a focal aircraft, and includes the viewer aircraft, at least one target aircraft, or both, where
         the selectable view is a view facing the focal aircraft
            from above the focal aircraft, and
            from any direction around the focal aircraft;
      receive first flight information data from the first data source when the viewer aircraft is included in the first request, where
         the first flight information data is representative of
            at least a position of the viewer aircraft, and
            the active flight plan of the viewer aircraft;
      send a second request for second flight information data of each target aircraft when at least one target aircraft is included in the first request, such that
         a first signal representative of the second request is transmitted to at least one second data source;
      receive the second flight information data in response to the second request that has been sent, where
         the second flight information data is representative of
            at least a position of each target aircraft, and
            the active flight plan of each target aircraft;
      retrieve terrain data based upon
         the selectable view, and
         the active flight plan of the focal aircraft;
      generate an image data set as a function of
         the terrain data,
         the first flight information data when the viewer aircraft is included in the first request, and
         the second flight information data of each target aircraft when at least one target aircraft is included in the first request, where
            the image data set is representative of an image of a three-dimensional scene of the selectable view comprised of at least
               a first image of the sky,
               a second image of the spherical Earth having the visual appearance of a spherical shape corresponding to the selectable view, and indicative of a surface and curvature of the Earth,
               a third image having the visual appearance of a first three-dimensional curved flight path, and
               a fourth image having the visual appearance of a first three-dimensional aircraft symbol, where
                  the background of the three-dimensional scene is comprised of
                     the first image, and
                     the second image,
                  the path third image
                     overlays the background of the three-dimensional scene, and
                     is representative of and coincides with the active flight plan of focal aircraft, and
                  the fourth image
                     overlays the background of the three-dimensional scene, and
                     is representative of the focal aircraft, and
                     coincides with a position at least a longitude and latitude of the focal aircraft; and
      provide the image data set to the display unit, whereby the three-dimensional scene of the selectable view represented in the image data set is presentable on the display unit.

2. The system of claim 1, wherein the manual input device is the screen of the display unit.

3. The system of claim 1, wherein one second data source is installed in at least one target aircraft.

4. The system of claim 1, wherein
one second data source is comprised of
   a network database configured to
      receive periodically-updated information comprised of
         at least a position of at least one target aircraft, the viewer aircraft, or both, and
         the active flight plan of at least one target aircraft, the viewer aircraft, or both, and
      store the periodically-updated information.

5. The system of claim 1, wherein
the image represented in the image data set is further comprised of
   at least one fifth image having the visual appearance of one second three-dimensional curved flight path of each non-focal aircraft determined to be within the selectable view, where
      each fifth image
         overlays the background of the three-dimensional scene, and is representative of and coincides with the active flight plan of one non-focal aircraft.

6. The system of claim 5, wherein the image represented in the image data set is further comprised of
at least one sixth image having the visual appearance of one second three-dimensional aircraft symbol of each non-focal aircraft determined to be within the selectable view, where
each sixth image
overlays the background of the three-dimensional scene, and
is representative of and coincides with a position of one non-focal aircraft.

7. The system of claim 1, wherein the image generator is further configured to
send a third request for first flight information data when the viewer aircraft is included in the first request, such that
a second signal representative of the third request is transmitted to the first data source, whereby
the first flight information has been received in response to the third request.

8. The system of claim 7, wherein the manual input device and the display unit are integrated into a portable device.

9. A device for generating flight information of a plurality of aircraft that is presentable on a display unit, such device comprising:
an image generator configured to receive data representative of a first request in response to a selection made from a user-interactive menu via a manual input device, where
the first request
corresponds to a selectable view and a focal aircraft, and
includes a viewer aircraft, at least one target aircraft, or both, where
the selectable view is a view facing the focal aircraft
from above the focal aircraft, and
from any direction around the focal aircraft;
receive first flight information data from a first data source when the viewer aircraft is included in the first request, where
the first flight information data is representative of
at least a position of the viewer aircraft, and
the active flight plan of the viewer aircraft;
send a second request for second flight information data of each target aircraft when at least one target aircraft is included in the first request, such that
a first signal representative of the second request is transmitted to
at least one second data source;
receive the second flight information data in response to the second request that has been sent, where
the second flight information data is representative of
at least a position of each target aircraft, and
the active flight plan of each target aircraft;
retrieve terrain data based upon
the selectable view, and
the active flight plan of the focal aircraft;
generate an image data set as a function of
the terrain data,
the first flight information data when the viewer aircraft is included in the first request, and
the second flight information data of each target aircraft when at least one target aircraft is included in the first request, where the image data set is representative of an image of a three-dimensional scene of the selectable view comprised of at least
a first image of the sky,
a second image of the spherical Earth having the visual appearance of a spherical shape corresponding to the selectable view, and indicative of a surface and curvature of the Earth,
a third image having the visual appearance of a first three-dimensional curved flight path, and
a fourth image having the visual appearance of a first three-dimensional aircraft symbol, where
the background of the three-dimensional scene is comprised of
the first image, and
the second image,
the third image
overlays the background of the three-dimensional scene, and
is representative of and coincides with the active flight plan of focal aircraft, and
the fourth image
overlays the background of the three-dimensional scene, and
is representative of the focal aircraft, and
coincides with a position at least a longitude and latitude of the focal aircraft; and
provide the image data set to the display unit, whereby
the three-dimensional scene of the selectable view represented in the image data set is presentable on the display unit.

10. The device of claim 9, wherein one second data source is installed in at least one target aircraft.

11. The device of claim 9, wherein
one second data source is comprised of
a network database configured to
receive periodically-updated information comprised of
at least a position of at least one target aircraft, the viewer aircraft, or both, and
the active flight plan of at least one target aircraft, the viewer aircraft, or both, and
store the periodically-updated information.

12. The device of claim 9, wherein the image represented in the image data set is further comprised of
at least one fifth image having the visual appearance of one second three-dimensional curved flight path of each non-focal aircraft determined to be within the selectable view, where
each fifth image
overlays the background of the three-dimensional scene, and
is representative of and coincides with the active flight plan of one non-focal aircraft.

13. The device of claim 12, wherein the image represented in the image data set is further comprised of
at least one sixth image having the visual appearance of one second three-dimensional aircraft symbol of each non-focal aircraft determined to be within the selectable view, where
each sixth image
overlays the background of the three-dimensional scene, and
is representative of and coincides with a position of one non-focal aircraft.

14. The device of claim 9, wherein
the image generator is further configured to
send a third request for first flight information data when the viewer aircraft is included in the first request, such that
a second signal representative of the third request is transmitted to the first data source, whereby
the first flight information has been received in response to the third request.

15. A method for generating flight information of a plurality of aircraft that is presentable on a display unit, such method comprising:
performing the following elements, where such elements are performed by an image generator:
receiving data representative of a first request in response to a selection made from a user-interactive menu via a manual input device, where
the first request
corresponds to a selectable view and a focal aircraft, and
includes a viewer aircraft, at least one target aircraft, or both, where
the selectable view is a view facing the focal aircraft
from above the focal aircraft, and
from any direction around the focal aircraft;
receiving first flight information data from a first data source when the viewer aircraft is included in the first request, where
the first flight information data is representative of
at least a position of the viewer aircraft, and
the active flight plan of the viewer aircraft;
sending a second request for second flight information data of each target aircraft when at least one target aircraft is included in the first request, such that
a first signal representative of the second request is transmitted to at least one second data source;
receiving the second flight information data in response to the second request that has been sent, where
the second flight information data is representative of
at least a position of each target aircraft, and
the active flight plan of each target aircraft;
retrieving terrain data based upon
the selectable view, and
the active flight plan of the focal aircraft;
generating an image data set as a function of
the terrain data,
the first flight information data when the viewer aircraft is included in the first request, and
the second flight information data of each target aircraft when at least one target aircraft is included in the first request, where
the image data set is representative of an image of a three-dimensional scene of the selectable view comprised of at least
a first image of the sky,
a second image of the spherical Earth having the visual appearance of a spherical shape corresponding to the selectable view, and indicative of a surface and curvature of the Earth,
a third image having the visual appearance of a first three-dimensional curved flight path, and
a fourth image having the visual appearance of a first three-dimensional aircraft symbol, where
the background of the three-dimensional scene is comprised of
the first image, and
the second image,
the third image
overlays the background of the three-dimensional scene, and
is representative of and coincides with the active flight plan of focal aircraft, and
the fourth image
overlays the background of the three-dimensional scene, and
is representative of the focal aircraft, and coincides with a position at least a longitude and latitude of the focal aircraft; and
providing the image data set to a display unit, whereby
the three-dimensional scene of the selectable view represented in the image data set is presentable on the display unit.

16. The method of claim 15, wherein one second data source is installed in at least one target aircraft.

17. The method of claim 15, wherein
one second data source is comprised of
a network database configured to
receive periodically-updated information comprised of
at least a position of at least one target aircraft, the viewer aircraft, or both, and
the active flight plan of at least one target aircraft, the viewer aircraft, or both, and
store the periodically-updated information.

18. The method of claim 15, wherein
the image represented in the image data set is further comprised of
at least one fifth image having the visual appearance of one second three-dimensional curved flight path of each non-focal aircraft determined to be within the selectable view, where
each fifth image
overlays the background of the three-dimensional scene, and
is representative of and coincides with the active flight plan of one non-focal aircraft.

19. The method of claim 18, wherein
the image represented in the image data set is further comprised of
at least one sixth image having the visual appearance of one second three-dimensional aircraft symbol of each non-focal aircraft determined to be within the selectable view, where
each sixth image
overlays the background of the three-dimensional scene, and
is representative of and coincides with a position of one non-focal aircraft.

20. The method of claim 15, further comprising:
sending a third request for first flight information data when the viewer aircraft is included in the first request, such that
a second signal representative of the third request is transmitted to the first data source, whereby
the first flight information has been received in response to the third request.

21. The method of claim 15, wherein the manual input device and the display unit are integrated into a portable device.

* * * * *